(12) United States Patent
Thorn

(10) Patent No.: US 7,774,334 B2
(45) Date of Patent: Aug. 10, 2010

(54) ADAPTIVE DATABASES

(75) Inventor: Ola Karl Thorn, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 273 days.

(21) Appl. No.: 11/627,509

(22) Filed: Jan. 26, 2007

(65) Prior Publication Data

US 2008/0126436 A1     May 29, 2008

Related U.S. Application Data

(60) Provisional application No. 60/867,305, filed on Nov. 27, 2006.

(51) Int. Cl.
*G06F 17/30* (2006.01)
(52) U.S. Cl. ...................... 707/708; 705/14.1
(58) Field of Classification Search ............... None
See application file for complete search history.

(56) References Cited

U.S. PATENT DOCUMENTS

| | | | | |
|---|---|---|---|---|
| 2003/0125063 | A1* | 7/2003 | Svensson et al. | 455/517 |
| 2004/0111404 | A1* | 6/2004 | Mano et al. | 707/3 |
| 2005/0188330 | A1* | 8/2005 | Griffin | 715/816 |
| 2007/0027931 | A1* | 2/2007 | Heckenbach | 707/200 |

OTHER PUBLICATIONS

International Search Report and Written Opinion for corresponding PCT Application No. PCT/IB2007/052018 mailed Oct. 31, 2007, 12 pages.

Vassilis Kostakos et al., "Building Common Ground for Face to Face Interactions by Sharing Mobile Device Context", Location-and Context-Awareness Lecture Notes in Computer Science; LNCS, Springer-Verlag, BE, vol. 3987, May 2006, XP019032555, pp. 224-238.

Mark Dunlop et al., "Predictive Text Entry Methods for Mobile Phones", Personal Technologies, Springer, London, GB, May 2000, XP02289569, pp. 1-10.

Jeff Axup et al., "Usability of a Mobile, Group Communication Prototype While Rendezvousing", Collaborative Technologies and Systems, 2005; Proceedings of the 2005 International Symposium in St. Louis, MO, USA, May 15-20, 2005, XP010862905, pp. 24-31.

Eric Jui-Lin Lu et al., "Design and Implementation of a Mobile Database for Java Phones", Computer Standards and Interfaces, Elsevier Sequoia; Luasanne, CH. vol. 26, No. 5, Sep. 2004, XP004505832, pp. 401-410.

* cited by examiner

*Primary Examiner*—Apu M Mofiz
*Assistant Examiner*—Anteneh Girma
(74) *Attorney, Agent, or Firm*—Harrity & Harrity, LLP

(57) ABSTRACT

A communication device includes an input device that is configured to receive input from a user and a memory configured to store a first database associated with word prediction. The communication device may also include logic configured to form a connection with a second communication device, where the second communication device includes a second database associated with word prediction. The logic may also be configured to obtain at least part of the second database, store the obtained part of the second database and perform word prediction on the received input using the obtained part of the second database.

20 Claims, 7 Drawing Sheets

ADAPTIVE DATABASES

RELATED APPLICATION

This application claims priority under 35 U.S.C. §119 based on U.S. Provisional Application No. 60/867,305, filed Nov. 27, 2006, the disclosure of which is hereby incorporated herein by reference.

TECHNICAL FIELD OF THE INVENTION

The invention relates generally to communications and, more particularly, to exchanging information between communication devices.

DESCRIPTION OF RELATED ART

Communication devices, such as mobile terminals, may be used by individuals for communicating with users of other communication devices. For example, a communication device may be used to place/receive calls and send/receive text messages to/from other communication devices. Communication devices typically allow the user to enter text, such as text messages, via an alpha-numeric keypad.

SUMMARY

According to one aspect, a first communication device is provided. The first communication device comprises an input device configured to receive input from a user and a memory configured to store a first database associated with word prediction. The first communication device also includes logic configured to: form a connection with a second communication device, the second communication device including a second database associated with word prediction, obtain at least a portion of the second database, store at least the portion of the second database in the first communication device, and perform word prediction on the received input using at least the portion of the second database.

Additionally, when storing at least the portion of the second database, the logic may be configured to merge the portion of the second database with the first database, and stored the merged databases in the memory.

Additionally, the logic may be further configured to analyze the second database, and identify at least one of similarities or differences between the first and second databases.

Additionally, the logic may be further configured to determine whether to store at least the portion of the second database in the first communication device based on the identifying.

Additionally, when identifying at least one of similarities or differences between the first and second databases, the logic may be configured to: identify similarities based on the inclusion of at least one infrequently used word in both the first and second databases.

Additionally, the logic may be further configured to identify whether a contacts list or address book stored in each of the respective first and second communication devices include at least one same contact, and store at least the portion of the second database in the first communication device when the contacts list or address book stored in each of the respective first and second communication devices include at least one same contact.

Additionally, when performing word prediction, the logic may be configured to perform word prediction based on a time of day or a period of time.

Additionally, when performing word prediction based on the time of day or the period of time, the logic may be configured to weight a word more frequently input during a first time of day as a more likely word candidate corresponding to the received input when the input was received during the first time of day.

Additionally, when obtaining at least the portion of the second database, the logic may be configured to communicate with the second communication device over a wireless network, and retrieve at least the portion of the second database without input from the user.

Additionally, the first communication device may comprise a mobile terminal.

According to another aspect, a method may be performed in a first mobile terminal storing a first database associated with word prediction. The method comprises forming a connection with a second mobile terminal via a wireless network, where the second mobile terminal includes a second database associated with word prediction. The method may also include obtaining at least a portion of the second database and storing at least the portion of the second database in the first mobile terminal. The method may further include receiving input from a user via an alpha-numeric keypad and performing word prediction on the received input using the portion of the second database and the first database.

Additionally, the storing at least a portion of the second database may comprise merging the second database with the first database.

Additionally, the method may further comprise analyzing the second database; identifying at least one of similarities or differences between the first and second databases; and determining whether to store at least the portion of the second database in the first mobile terminal based on the identifying.

Additionally, the identifying at least one of similarities or differences between the first and second databases may comprise identifying similarities based on the inclusion of at least one infrequently used word in both the first and second databases.

Additionally, the method may further comprise identifying whether a contacts list or address book stored in each of the respective first and second mobile terminals include at least one same contact; and storing at least the portion of the second database in the first mobile terminal when the contacts list or address book stored in each of the respective first and second mobile terminals include at least one same contact.

Additionally, the performing word prediction may comprise weighting a word more frequently input by the user of the first mobile terminal during a first time of day as a more likely word candidate corresponding to the received input when the input was received during the first time of day.

Additionally, the obtaining may comprise communicating with the second mobile terminal over a wireless network, and retrieving at least the portion of the second database without input from the user.

According to a further aspect, a computer-readable medium having stored sequences of instructions may be provided. The instructions, when executed by at least one processor, cause the at least one processor to: form a connection with a first mobile terminal via a wireless network; access a first database of the first mobile terminal, the first database being associated with word prediction; analyze the first database; obtain at least a portion of the first database; and store at least the portion of the first database in a memory.

Additionally, the at least one processor may be included on a second mobile terminal comprising a second database. The instructions for analyzing the first database may cause the at least one processor to: identify at least one of similarities or differences between the first and second databases, and determine whether to store at least the portion of the first database in the second mobile terminal based on the identifying.

Additionally, the instructions for identifying at least one of similarities or differences between the first and second databases may cause the at least one processor to identify similarities based on the inclusion of at least one infrequently used word in both the first and second databases.

Additionally, the instructions for identifying at least one of similarities or differences between the first and second databases may cause the at least one processor to identify similarities based on common information stored in a contacts list or address book stored in each of the respective first and second mobile terminals.

Additionally, the computer-readable medium may further comprise instructions for causing the at least one processor to receive user input associated with a text message, and perform word recognition on the user input using the stored portion of the first database.

Additionally, the at least one processor may be included on a second mobile terminal and the instructions for causing the at least one processor to perform word recognition may cause the at least one processor to weight a word more frequently input by the user of the second mobile terminal during a first time of day as a more likely word candidate corresponding to the received input when the input was received during the first time of day.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
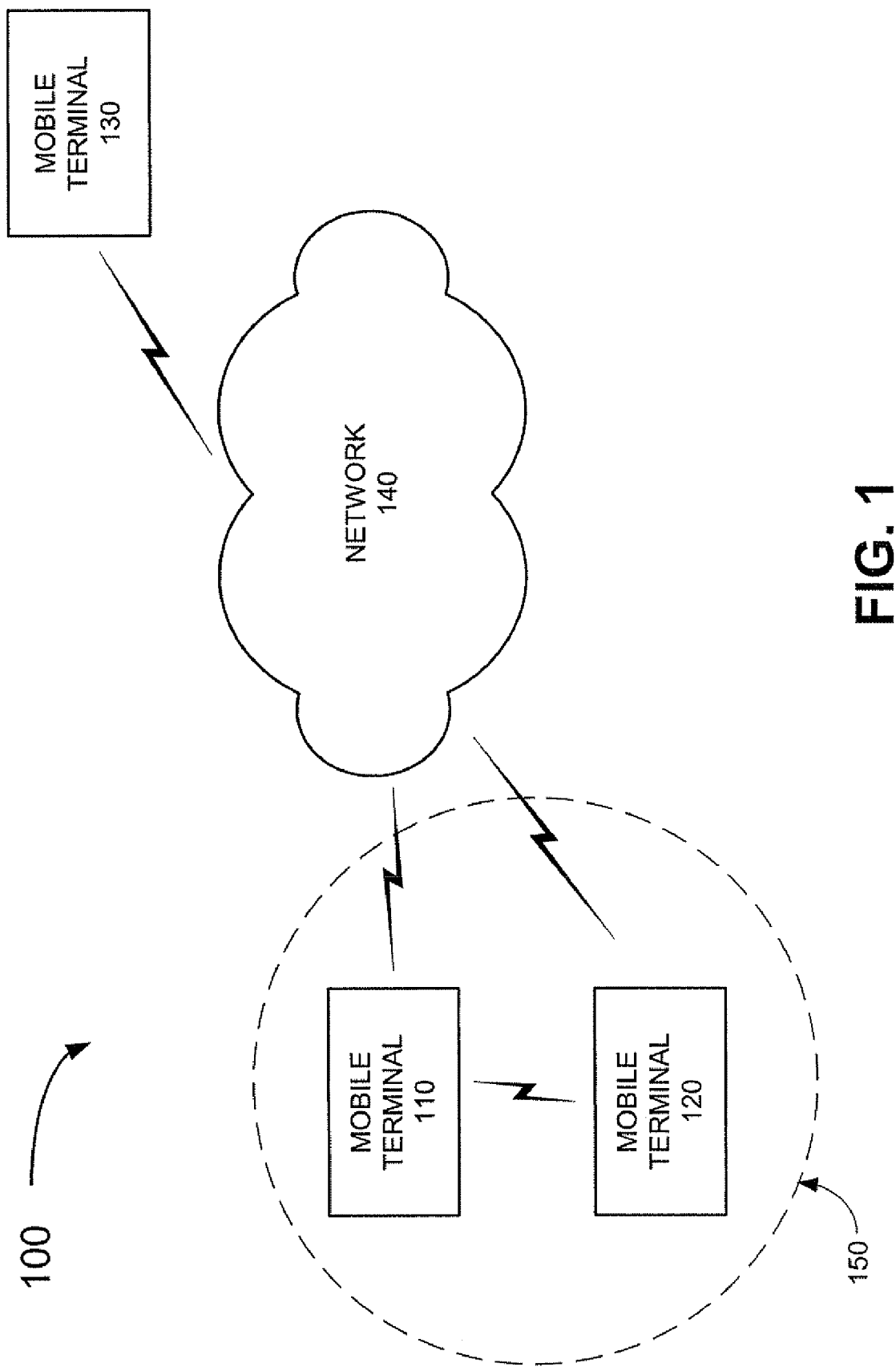
FIG. 1 is a diagram of an exemplary system in which methods and systems described herein may be implemented.

FIG. 1 is a diagram of an exemplary system 100 in which methods and systems described herein may be implemented. System 100 may include mobile terminals 110, 120 and 130 connected via network 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Aspects of the invention are described herein in the context of a mobile terminal, such as one of mobile terminals 110-130. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Network 140 may include one or more networks including a cellular network, a satellite network, the Internet, a telephone network, such as the Public Switched Telephone Network (PSTN), a metropolitan area network (MAN), a wide area network (WAN), a local area network (LAN) or another type of network. Mobile terminals 110, 120 and 130 may communicate with each other over network 140 via wired, wireless or optical connections.

In an exemplary implementation, network 140 includes a cellular network that uses components for transmitting data to and from mobile terminals 110, 120 and 130. Such components may include base station antennas (not shown) that transmit and receive data from mobile terminals within their vicinity. Such components may also include base stations (not shown) that connect to the base station antennas and communicate with other devices, such as switches and routers (not shown) in accordance with known techniques.

System 100 may also include an ad hoc network that enables mobile terminals in system 100 to locate one another and communicate with one another. For example, system 100 may include an ad hoc network 150, shown by the dashed circle in FIG. 1. Ad hoc network 150 may include mobile terminals 110 and 120. It should be understood that ad hoc network 150 may include additional components and additional mobile terminals (not shown).

In an exemplary implementation, mobile terminals 110-130 may employ "beacons" as a way in which one mobile terminal may locate another mobile terminal in ad hoc network 150. A beacon is a transmission that can be generated by one mobile terminal and may be received by some or all of the mobile terminals within a transmission range. That is, the beacon may be a broadcast transmission rather than a transmission to any particular mobile terminal/node. The beacon may be used to initiate communications between two mobile terminals, as described in more detail below.

Figure 2:
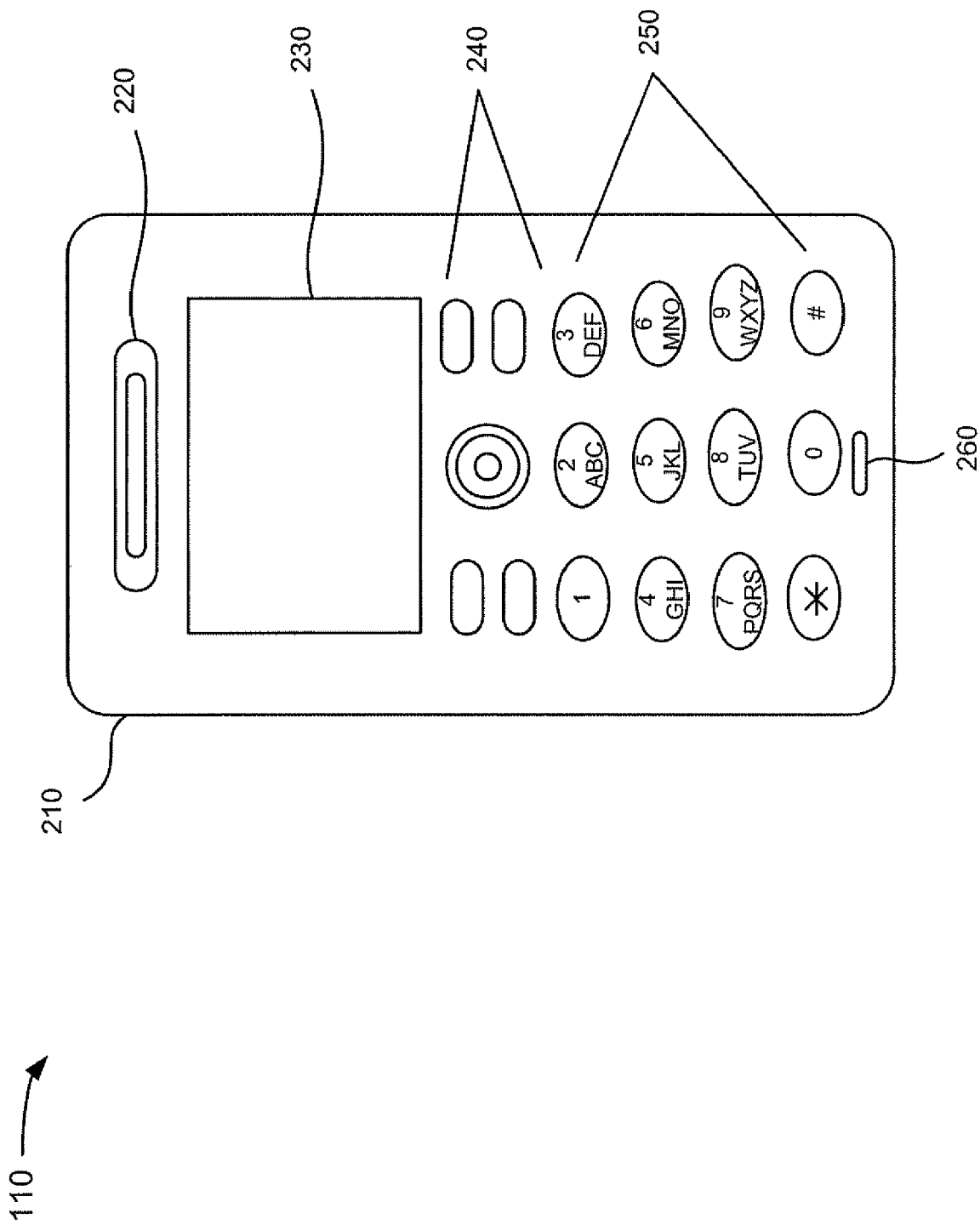
FIG. 2 is a diagram of a mobile terminal of FIG. 1 according to an exemplary implementation.

FIG. 2 is a diagram of an exemplary mobile terminal 110 in which methods and systems described herein may be implemented. It should be understood that mobile terminals 120 and 130 may include the same or similar elements and may be configured in the same or a similar manner.

Referring to FIG. 2, mobile terminal 110 may include a housing 210, a speaker 220, a display 230, control buttons 240, a keypad 250, and a microphone 260. Housing 210 may protect the components of mobile terminal 110 from outside elements. Speaker 220 may provide audible information to a user of mobile terminal 110.

Display 230 may provide visual information to the user. For example, display 230 may provide information regarding incoming or outgoing telephone calls and/or incoming or outgoing electronic mail (e-mail), instant messages (IMs), short message service (SMS) messages, etc. Display 230 may also display information regarding various applications, such as a phone book/contact list stored in mobile terminal 110, the current time, video games being played by a user, downloaded content (e.g., news or other information), etc.

Control buttons 240 may permit the user to interact with mobile terminal 110 to cause mobile terminal 110 to perform one or more operations, such as place a telephone call, play various media, etc. For example, control buttons 240 may include a dial button, hang up button, play button, etc. In an exemplary implementation, control buttons 240 may include one or more buttons that control various applications executed by mobile terminal 110. For example, one of control buttons 240 may be used to execute an application program for sharing information with other mobile terminals, such as sharing word prediction databases.

Keypad 250 may include a standard telephone keypad. As illustrated, many of the keys on keypad 250 may include numeric values and various letters. For example, the key with the number 2 includes the letters A, B and C. These letters may be used by a user when inputting text to mobile terminal 110. Other types of input devices may also be provided. For example, in other implementations, a touch screen may be provided to enter information. In still other implementations, a QWERTY keyboard or a Dvorak keyboard may be used. In addition, a gesture-based input device, an optical character recognition (OCR) based input device, a joystick, a virtual keyboard, a speech-to-text engine, etc., may be used to input information to mobile terminal 110. Microphone 260 may receive audible information from the user.

Figure 3:
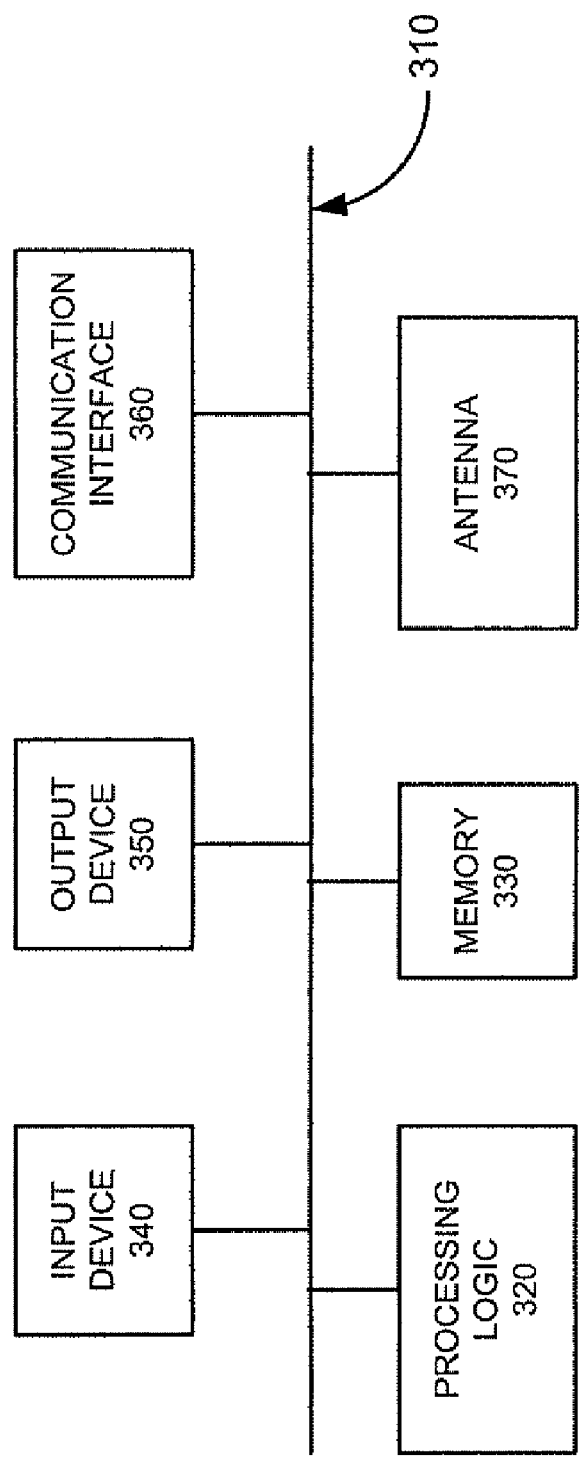
FIG. 3 is a an exemplary functional block diagram of components implemented in the mobile terminal of FIG. 2 according to an exemplary implementation.

FIG. 3 is a diagram illustrating components of mobile terminal 110 according to an exemplary implementation. Referring to FIG. 3, mobile terminal 110 may include bus 310, processing logic 320, memory 330, input device 340, output device 350, communication interface 360 and antenna 370. Bus 310 permits communication among the components of mobile terminal 110. One skilled in the art would recognize that mobile terminal 110 may be configured in a number of other ways and may include other or different elements. For example, mobile terminal 110 may include one or more modulators, demodulators, encoders, decoders, etc., for processing data and one or more power supplies for powering mobile terminal 110.

Processing logic 320 may include a processor, microprocessor, an application specific integrated circuit (ASIC), field programmable gate array (FPGA) or the like. Processing logic 320 may execute software instructions/programs or data structures to control operation of communication device 110.

Memory 330 may include a random access memory (RAM) or another type of dynamic storage device that stores information and instructions for execution by processing logic 320; a read only memory (ROM) or another type of static storage device that stores static information and instructions for use by processing logic 320; a flash memory (e.g., an electrically erasable programmable read only memory (EEPROM)) device for storing information and instructions; and/or some other type of magnetic or optical recording medium and its corresponding drive. Memory 330 may also be used to store temporary variables or other intermediate information during execution of instructions by processing logic 320. Instructions used by processing logic 320 may also, or alternatively, be stored in another type of computer-readable medium accessible by processing logic 320. A computer-readable medium may include one or more memory devices and/or carrier waves.

Input device 340 may include mechanisms that permit an operator to input information to mobile terminal 110, such as microphone 260, keypad 250, control buttons 240, a keyboard (e.g., a QWERTY keyboard or a Dvorak keyboard), a gesture-based input device, an OCR based input device, a joystick, a virtual keyboard, a speech-to-text engine, a mouse, a pen, voice recognition and/or biometric mechanisms, etc., may be used to input information to mobile terminal 110. Microphone 260 may receive audible information from the user.

Output device 350 may include one or more mechanisms that output information to the user, including a display, such as display 230, a printer, one or more speakers, such as speaker 220, etc.

Communication interface 360 may include any transceiver-like mechanism that enables mobile terminal 110 to communicate with other devices and/or systems. For example, communication interface 360 may include a modem or an Ethernet interface to a LAN. Communication interface 360 may also include mechanisms for communicating via a network, such as a wireless network. For example, communication interface 360 may include one or more radio frequency (RF) transmitters, receivers and/or transceivers for transmitting and receiving RF data via network 140. Antenna 370 may include one or more antennas for transmitting and receiving RF signals.

Mobile terminal 110 may provide a platform for a user to make and receive telephone calls, send and receive electronic mail, text messages, multi-media messages, short message service (SMS) messages, etc., and execute various other applications. Mobile terminal 110 may also perform processing associated with exchanging information with other mobile terminals, such as databases associated with word prediction, as described in detail below. Mobile terminal 110 may perform these operations in response to processing logic 320 executing sequences of instructions contained in a computer-readable medium, such as memory 330. Such instructions may be read into memory 330 from another computer-readable medium via, for example, communication interface 360. A computer-readable medium may include one or more memory devices and/or carrier waves. In alternative embodiments, hard-wired circuitry may be used in place of or in combination with software instructions to implement processes consistent with the invention. Thus, implementations described herein are not limited to any specific combination of hardware circuitry and software.

Aspects of the invention are described herein in the context of a mobile terminal. It should also be understood that systems and methods described herein may also be implemented in other devices that include various word prediction functionality without various other communication functionality. For example, aspects of the invention may be implemented in a personal computer (PC), a laptop computer, a PDA, a media playing device (e.g., an MPEG audio layer 3 (MP3) player, a video game playing device), etc.

Figure 4:
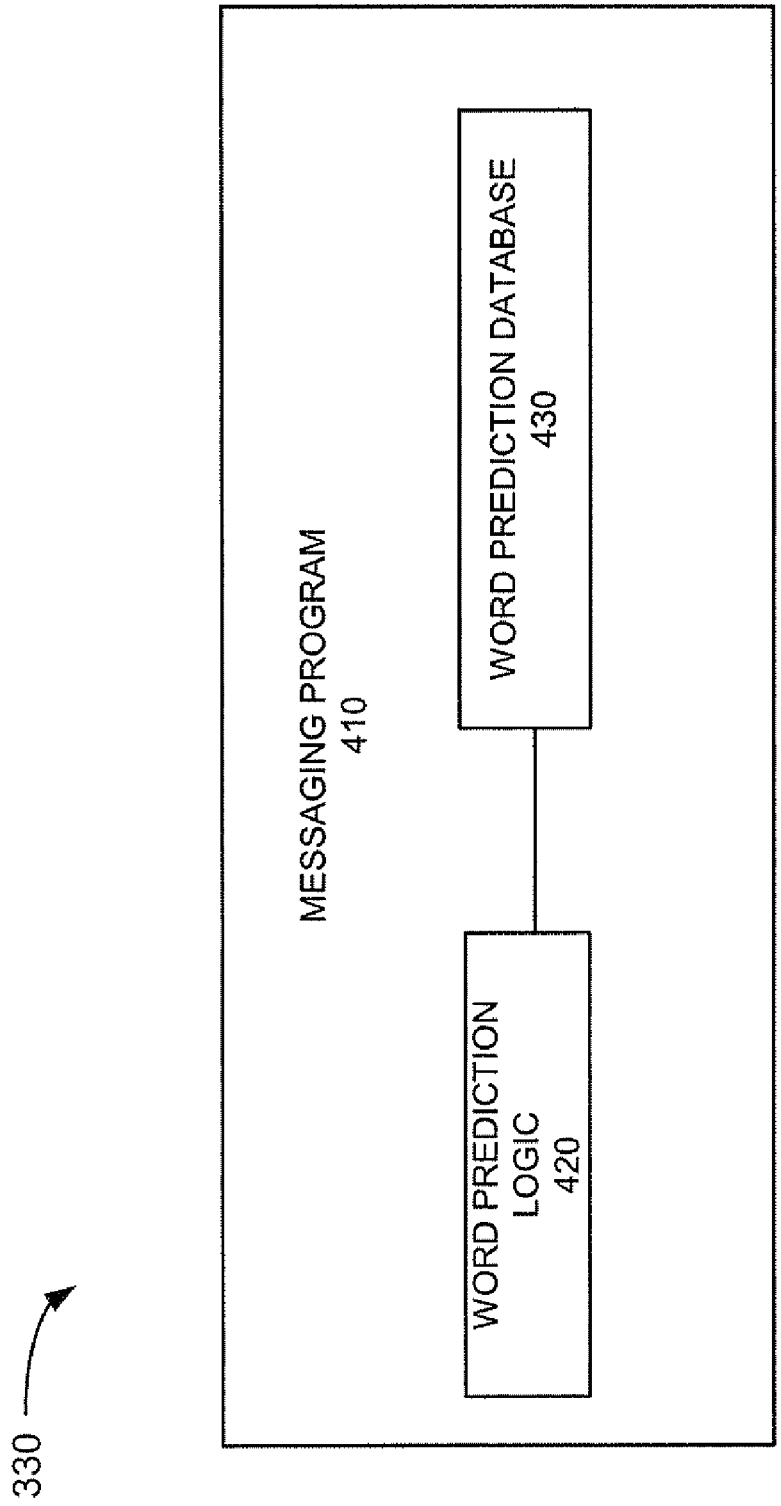
FIG. 4 is a functional block diagram of components implemented in the mobile terminal of FIG. 3.

FIG. 4 is an exemplary functional block diagram of components implemented in mobile terminal 110 of FIG. 3, such as in memory 330. Referring to FIG. 4, memory 330 may include a messaging program 410 including word prediction logic 420 and word prediction database 430. Word prediction logic 420 and word prediction database 430 are illustrated as being included in messaging program 410. In other implementations, one or more of these components may be located externally with respect to messaging program 410.

Messaging program 410 may include any type of messaging program used to transmit and receive messages to/from other devices, such as mobile terminals 120 and 130. For example, messaging program 410 may include a multimedia message service (MMS) based program, a short message service (SMS) based program, an instant messaging (IM) based program, an e-mail program, or another text based application program that allows mobile terminal 110 to communicate with other devices.

Word prediction logic 420 may include logic used to predict words being entered by a user as they are being entered or typed. Word prediction logic 420 may provide candidate characters, next characters, words, next words and/or phrases to the user via, for example, display 230 as the user is entering the text via keypad 250. The terms "candidate character," "candidate next character," "candidate word, "candidate next word" or "candidate phrase," as used herein refer to a character, next character, word, next word or phrase, respectively, that potentially matches the character/word/phrase that the user intends to input via keypad 250. In an exemplary implementation, word prediction logic 420 may use word prediction database 430 to perform word prediction, as described in detail below.

Word prediction database 430 may include a database of common words and/or phrases. In some implementations, word prediction database 430 may be dynamically updated as the user of mobile terminal 110 enters messages and/or receives messages. For example, word prediction database 430 may be pre-loaded with a number of commonly used words and phrases that are most often used in a particular language. As messaging program 410 generates and receives messages, words/phrases not already stored in word prediction database 430 may be added to word prediction database 430. In this manner, word prediction database 430 is more likely to include words that may be used in the future by the user of mobile terminal 110.

As described briefly above, in conventional systems, each alphanumeric button on keypad 250 (FIG. 2) may correspond to one of three different letters. For example, when a user inputs the number "2" via a conventional keypad, the corresponding text may be any of the letters A, B or C. In a conventional T9/Zi type predictive input scheme, a messaging program guesses or predicts which letter the user intended to type. For example, if the user enters "843," a conventional messaging program may assume that the user intended to enter the word "the." In such systems, the messaging program may use a dictionary of common words to predict what a user wishes to input. Such conventional systems, however, are often unable to find the correct word in various scenarios.

Exemplary Processing

Figure 5:
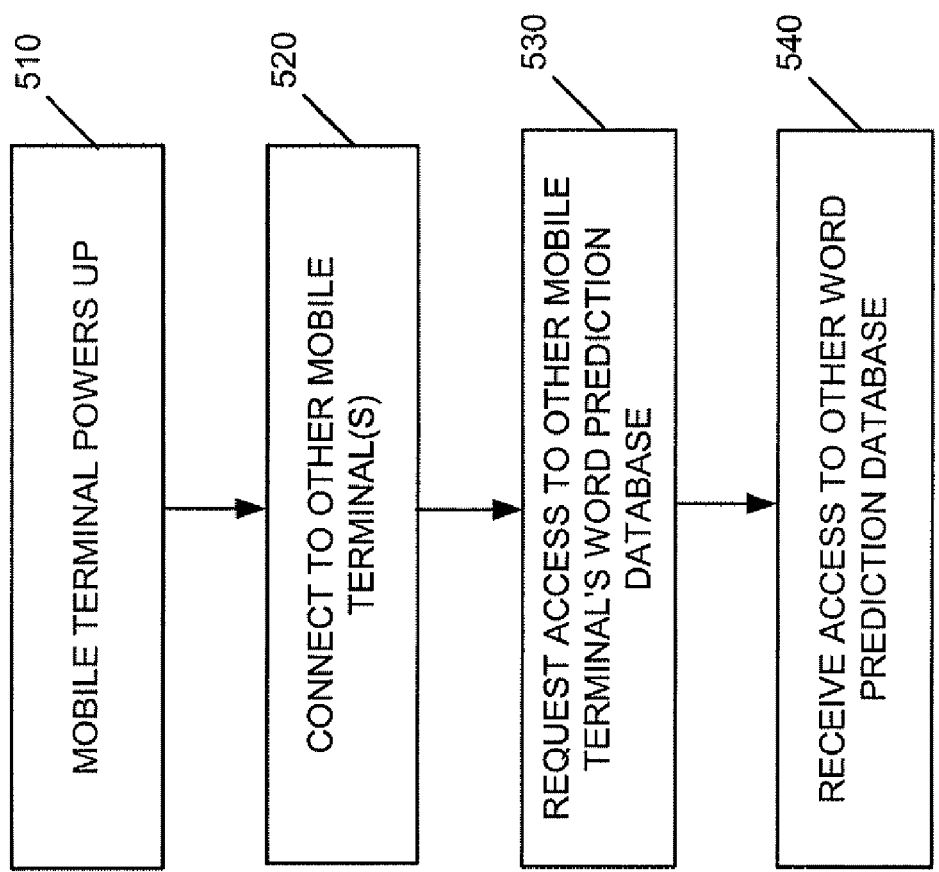
FIGS. 5-7 are flow diagrams illustrating exemplary processing by mobile terminals in an exemplary implementation.

In an exemplary implementation, mobile terminal 110 may connect with other devices, such as other mobile terminals, to exchange information in their respective word prediction databases. FIG. 5 is a flow diagram illustrating exemplary processing by mobile terminals, such as one or more of mobile terminals 110-130, for connecting an exchanging information with another mobile terminal. Processing may begin when a mobile terminal, such as mobile terminal 110, powers up (act 510). Assume that the user of mobile terminal 110 wishes to exchange/receive information associated with its word prediction database 430 with other parties. For example, the user of mobile terminal 110 may wish to receive information regarding the word prediction database 430 stored in another mobile terminal in its vicinity. The user of mobile terminal 110 may also wish to allow other mobile terminals to receive its word prediction database 430. In this case, users of mobile terminals, such as mobile terminals 110-130 may connect to one another (act 520). For example, mobile terminals 110-130 may form a local ad hoc network or connect to an existing ad hoc network, such as ad hoc network 150.

For example, in one implementation, after mobile terminal 110 powers up, the user of mobile terminal 110 may initiate an application program associated with sharing word prediction database 430 with other mobile terminals. The user may initiate the application via, for example, input device 340 (FIG. 2), which may include pressing one or control buttons 240 or a keypad input on mobile terminal 110. After initiating the program, mobile terminal 110 may send a beacon transmission, as described above. In other implementations, mobile terminal 110 may automatically initiate the process of communicating with other mobile terminals in its vicinity without requiring human input. That is, mobile terminal 110 may automatically exchange information and set up connections with other mobile terminals as a background process associated with the application program for sharing word prediction databases without requiring input from the user of mobile terminal 110.

In each case, other mobile terminals in the vicinity of mobile terminal 110 may receive the beacon signal and exchange information with mobile terminal 110, such as identifiers that may be used to facilitate communications between mobile terminal 110 and the other mobile terminals that receive the beacon. Assume that mobile terminal 120 is in the vicinity of mobile terminal 110 and receives the beacon signal from mobile terminal 110. Further assume that mobile terminal 110 and mobile terminal 120 are able to communicate with each other and form part of ad hoc network 150.

In alternative implementations, mobile terminal 110 may be configured to communicate with other mobile terminals using predetermined signaling upon powering up. For example, mobile terminal 110 may be configured to communicate with other mobile terminals 110 via Bluetooth, WiFi, infrared (IR) techniques or some other communication technique.

In each case, assume that mobile terminal 110 is in the vicinity or is relatively close to the location of mobile terminal 120 and that mobile terminal 110 is able to form a connection/link with mobile terminal 120. Further assume that the user of mobile terminal 110 wishes to retrieve information from mobile terminal 120 associated with mobile terminal's 120 word prediction database 430. In this case, mobile terminal 110 may send a request to mobile terminal 120 indicating that it would like to access mobile terminal's 120 word prediction database (referred to herein as word prediction database 430B) (act 530).

Assume that mobile terminal 120 receives the request and grants access to mobile terminal 110 to word prediction database 430B (act 540). Mobile terminal 110 may then analyze word prediction database 430B to determine whether it would like to upload or merge a portion of word prediction database 430B with its word prediction database 430. It should be noted that in some implementations, mobile terminal 110 may merge word prediction database 430B with its own word prediction database 430 to create a single word prediction database without analyzing the content or may upload word prediction database 430B to mobile terminal 110 for later analysis.

Figure 6:
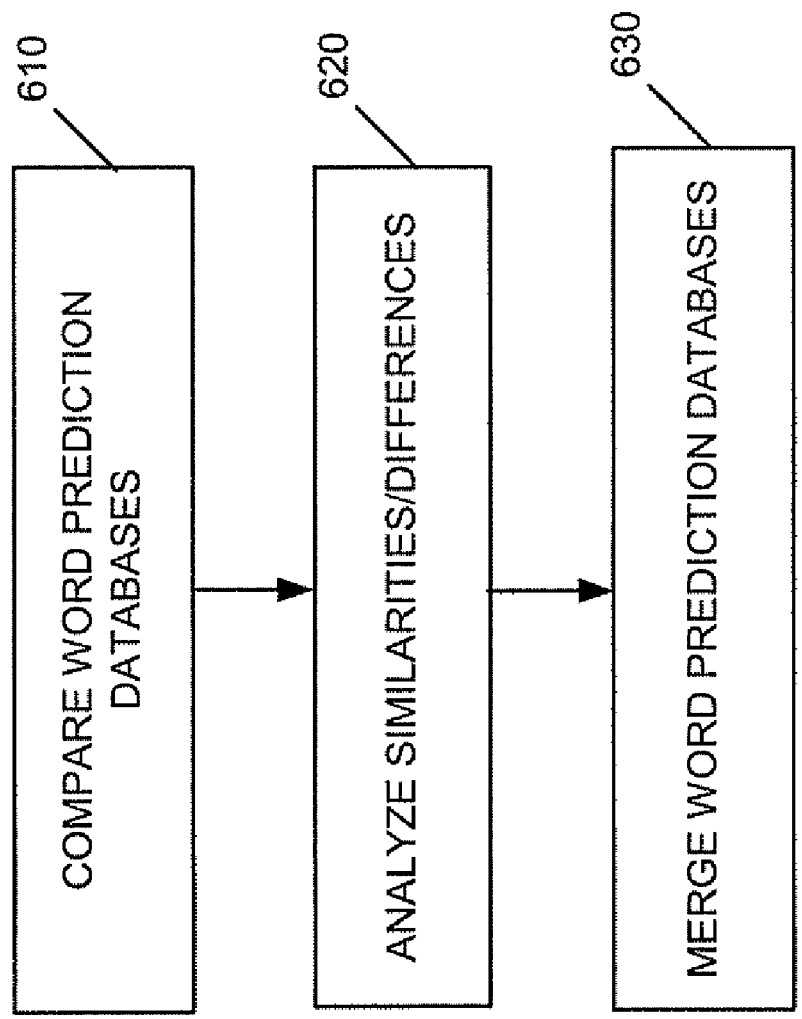

FIG. 6 illustrates exemplary processing associated with analyzing word prediction database 430B. Processing may begin with processing logic 320 comparing word prediction database 430 with word prediction database 430B (act 610). For example, processing logic 320 may identify how often the users of mobile terminals 110 and 120 have used different words. For example, word prediction databases 430 and 430B may include words used in various messages and may also include information identifying the frequency or how many times each of the words has been used in a message. Processing logic 320 may also identify the order of various words provided to the user of mobile terminal 120 in a candidate list. For example, processing logic 320 may identify the order with which mobile terminal 120 has listed various candidate words to the user of mobile terminal 120.

Processing logic 320 may also determine the extent to which word prediction database 430 and 430B differ in content. For example, processing logic 320 may compare databases 430 and 430B to determine whether word prediction databases 430 and 430B include very few of the same words, other than very commonly used words. Such lack of correspondence may indicate that the users of mobile terminals 110 and 120 are unlikely to use similar words when generating text messages. This may indicate that database 430B is not a good candidate for merging with word prediction database 430 since it may be unlikely that the users of mobile terminals 110 would use similar words when generating text based messages.

Processing logic 320 may also check for unusual words or expressions or words/expressions that are unique or distinctive in database 430B. Such words may correspond to words/ terms that are not often used in the particular language or are words that are associated with a particular field of endeavor. To identify these unusual/distinctive words, processing logic 320 may scan word prediction database 430B to identify words that have been infrequently input or used by the user of mobile terminal 120 when generating text messages and/or words that have been infrequently encountered by processing logic 320, such as in received text messages or in accessing word prediction databases of other mobile terminals. The determination of the unique/distinctive character may also be made relative to other mobile terminals that mobile terminal 110 has encountered. As an example, assume that word prediction database 430B includes the word "brontosaurus" and that mobile terminal 110 has not encountered the word "brontosaurus" in another mobile terminal, but that mobile terminal 110 already has the word "brontosaurus" stored in word prediction database 430. Since both mobile terminals 110 and 120 share this unique word, processing logic 320 may determine that the users of mobile terminals 110 and 120 are more likely to have similar word prediction databases and are more likely to use similar words when generating text based messages. That is, use of unusual or infrequently used words may indicate similar interests, professions, etc. In addition, use of similar slang words or expressions may indicate similarity in age and/or interests, which may also indicate that the users would use similar words/phrases when generating text-based messages.

Processing logic 320 may also identify words in word prediction database 430B that are more frequently used at various times of day or intervals/periods of time during the day. For example, words such as "cab," "movie" and "drinks," may be more frequently used by the user of mobile terminal 120 in the evening. Other words, such as "work," and "breakfast" may be used more frequently in the morning. Processing logic 320 may compare this time of day usage to the time of day usage for words/terms in database 430B to time of usage information for words in word prediction database 430. If the time of day usage is similar, this may indicate that the users of mobile terminals 110 and 120 are more likely to have similar interests and may use similar words when generating text based messages.

Processing logic 320 may also determine if the users of mobile terminals 110 and 120 know each other and/or share contacts. For example, processing logic 320 may check a contacts list or address book stored in mobile terminal 120 and compare it to its own contact list/address book. If the users of mobile terminals 110 and 120 know each other (e.g., the contact information associated with the user of mobile terminal 120 is stored in the contacts list of mobile terminal 110 or vice versa) or if the contacts list/address book share a number of contacts (e.g., one or more of the contacts stored in mobile terminal 120 is also stored in the contacts list of mobile terminal 110), this may indicate that the users are more likely to have common interests and may use similar words when generating text based messages.

Processing logic 320 may then analyze the collected data to determine whether to merge databases 430 and 430B. For example, in one implementation, processing logic 320 may determine that if mobile terminals 110 and 120 share a predetermined number of unique/distinctive words, that database 430B should be merged with database 430. In other implementations, processing logic 320 may determine that if mobile terminal 120 includes a predetermined number of words used at certain times of day that match the words used by mobile terminal 110 at the same times of day, that database 430B should be merged with database 430.

In each case, processing logic 320 may determine whether to merge the entire database 430B with database 430 or a portion of database 430B with 430. For example, processing logic 320 may determine to merge only portions of database 430B (e.g., words frequently used by the user of mobile terminal 120 at certain times of day). Based on its determination, processing logic 320 may merge the desired portion (or all) of database 430B with database 430 (act 630). The merged databases may then be stored in mobile terminal 110 (e.g., in word prediction database 430) and may be used to generate candidate words in response to user input.

In some implementations, mobile terminal 110 may generate a threshold or baseline prior to determining whether to merge another user's word prediction database with its word prediction database 430. For example, mobile terminal 110 may initially start up with no index or ranking on how common various words are and may "learn" and refine this common/uncommon quality each time it encounters another mobile terminal's word prediction database. The threshold may be based on how many mobile terminals that mobile terminal 110 encounters. That is, a predetermined number of mobile terminals may be encountered before establishing the baseline or threshold.

In some implementations, the threshold may be based on statistical variance with respect to the information stored in the various word prediction databases. For example, the threshold may be based on not only the number of other mobile terminals encountered, but a certain amount of variation that has been encountered. This may enable processing logic 320 to receive enough information to provide a good baseline/threshold prior to determining whether to merge another database with its word prediction database 430.

Figure 7:
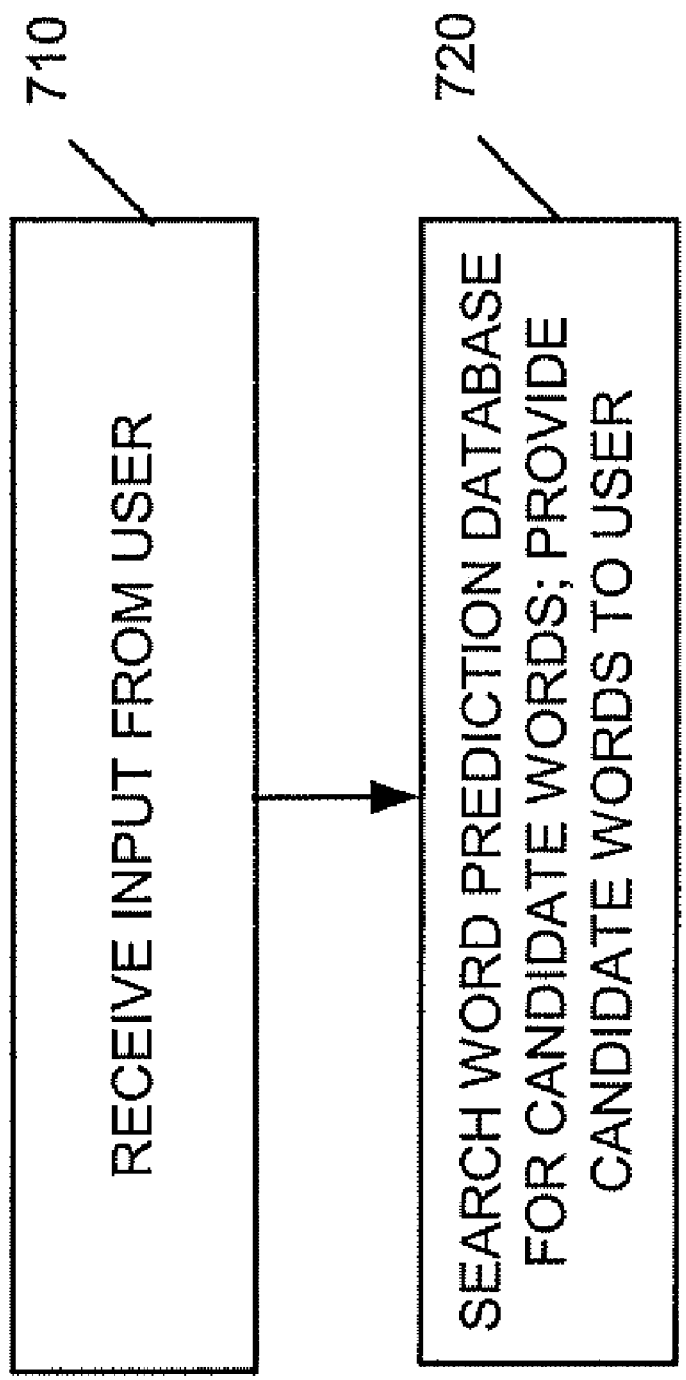

FIG. 7 illustrates exemplary processing associated with using the merged database by messaging program 410. Processing may begin with a user launching messaging program 410 to generate and/or respond to a received message from another communication device (e.g., mobile terminal 130). Assume that the user is composing a message, and the user has entered the letters "897" (act 710). Word prediction logic 420 may search word prediction database 430 and identify "tyrannosaurus" as a candidate word corresponding to the input "897" and provide the candidate word via display 230 (act 720). This word (i.e., tyrannosaurus) may have been received from database 430B and stored in mobile terminal 110 during the processing described above with respect to FIG. 6. Assume that this word is the word that the user of mobile terminal 110 wishes to input. The user of mobile terminal 110 may then select this input using, for example, one of control buttons 240 without requiring the user to enter more of the letters of the word using keypad 250. In this manner, word prediction database 430 may use one or more words received from another word prediction database (e.g., word prediction database 430B in this example) to identify candidate words in a text based message.

In each case, accessing other users' word prediction databases may allow word prediction logic 420 to identify candidate words that it otherwise would not have been able to identify, identify candidate words with fewer input characters than were previously needed, rank various candidate words differently, etc., to enhance the functionality of word prediction logic 420.

In some implementations, databases obtained from other mobile terminals, such as database 430B, may be stored separately from word prediction database 430. In these implementations, word prediction logic 420 may search both word prediction database 430 and the retrieved word prediction databases (e.g., word prediction database 430B) when performing word prediction. If no words or terms from the retrieved word prediction database, such as word prediction database 430B, are actually identified and selected by the user during input of a text message within a predetermined period of time, processing logic 320 may delete the retrieved word prediction database (i.e., word prediction database 430B in this example) since no words/terms were actually identified and/or selected for input by the user. If, however, a word/term provided from word prediction database 430B was actually selected by the user within the predetermined period of time, processing logic 320 may indicate that word prediction database 430B is not to be deleted. Processing logic 320 may also merge the retrieved word prediction database 430B with word prediction database 430 if one or more terms identified from word prediction database 430B were selected by the user during input of a text message(s).

Although not described above, other mobile terminals (e.g., mobile terminal 130) may access mobile terminal's 110 word prediction database 430 and/or download a portion of word prediction database 430 for merging with its word prediction database. In some instances, if mobile terminal 110 stores data from a number of other mobile terminals, the other mobile terminal (e.g., mobile terminal 130) may then download information from all or some of these other mobile terminals encountered by mobile terminal 110, based on, for example, similarities or coherence between the databases (e.g., coherence between mobile terminal's 130 word prediction database and word prediction database 430). In this manner, populating a word prediction database on a mobile terminal may occur very quickly.

In some implementations, information other than specifically designated word prediction databases may be used by mobile terminals to aid in word prediction. For example, mobile terminal 110 may access various documents, such as cached web pages stored on other mobile terminals, such as mobile terminal 120. The information stored on mobile terminal 120 may then be compared to information stored on mobile terminal 110 in a manner similar to that described above with respect to word prediction databases 430 and 430B to determine whether to store a portion, all or none of the accessed information from mobile terminal 120 on mobile terminal 110. As an example, assume that the user of mobile terminal 110 has searched the Internet for information associated with the word brontosaurus (e.g., web surfed using the term brontosaurus). If the user of mobile terminal 120 has also searched this term on the Internet and the memory of mobile terminal 120 includes a cached web page or cached URL associated with the word brontosaurus, mobile terminal 110 may determine that this information (e.g., the cached web page and/or cached URL), as well as other information from mobile terminal 120, may be relevant or likely to aid in word prediction or for other purposes by the user of mobile terminal 110. Mobile terminal 110 may then store this information from mobile terminal 120 on mobile terminal 110 and use this information for future word prediction related purposes. In this manner, if the users of mobile terminals 110 and 120 have similar browsing histories, mobile terminal 110 may store information from mobile terminal 120 in its own storage.

In a similar manner, mobile terminal 120 (e.g., processing logic 320) may analyze images stored in mobile terminal 120 and compare these images to images stored on mobile terminal 110. If the images are sufficiently related, mobile terminal 110 may store these images and other information from mobile terminal 120 on mobile terminal 110. Mobile terminal 110 may then use this information to aid in word prediction.

In still other implementations, mobile terminal 110 may determine whether the users of mobile terminals 110 and 120 have visited the same physical locations, such as various cities, states, countries, to determine whether the users of mobile terminals 110 and 120 likely share common interests. For example, mobile terminals 110 and 120 may each include a GPS receiver or some other device that enables each of mobile terminals 110 and 120 to determine its respective locations and to store a history of location information. Mobile terminal 110 may then compare the history of physical locations associated with mobile terminal 120 to its own history of physical locations (e.g., city names, state names, country names, etc.) For example, if the user of mobile terminal 120 has used mobile terminal 120 in Washington, D.C. and Lund, Sweden (or been in these places with mobile terminal 120) and mobile terminal 110 also has these stored locations, mobile terminal 110 may determine that various content on mobile terminal 120 (which may include word prediction database 430B and other information (e.g., various files, cached data, etc.) may be useful for mobile terminal 110 in performing word prediction or for other purposes. Other location information stored by mobile terminals 110 and 120 may include names of particular restaurants, public parks, stadiums, etc., and the frequency at which these places were visited. This information may also be used to determine whether information on mobile terminal 120 may be useful for the user of mobile terminal 110. In this manner, if the users of mobile terminals 110 and 120 have visited the same locations, mobile terminal 110 may store information from mobile terminal 120 in its own storage.

CONCLUSION

Implementations consistent with the aspects described herein enable users to share all or a portion of databases used to perform word prediction. Such processing enhances a messaging experience by making it more likely that the word prediction database will include relevant words, terms and/or expressions.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the description above focused on merging databases including words. It should be understood that the word prediction databases may also include phrases, expressions, uniform resource locators (URLs) that are difficult to input via an alpha-numeric keypad, or other types of information that may be input by a user. In addition, the word prediction databases may also be used by word prediction logic 420 to perform next word prediction based on phrases or expressions stored in the word prediction databases. For example, if the phrase "play soccer" was stored in the word prediction database and the user has input the word "play," word prediction logic 420 may provide a next word candidate "soccer" after the word play.

In addition, the description above focused on forming, for example, wireless or over the air connections between mobile terminals. In other implementations, mobile terminals may exchange word prediction databases stored on, for example, a computer disk, memory stick or some other computer-readable medium.

Still further, in some implementations, a server accessible to a large number of mobile terminals may be provided and the server may include word usage associated with a number of mobile terminals. The server may be provided with this word usage information each time a text input application executed by one of the mobile terminals (e.g., mobile terminals 110-130) sends a message or on an intermittent basis by various mobile terminals. A particular mobile terminal (e.g., mobile terminal 110) may then access the server on a real-time basis, at regular intervals or at irregular intervals and receive and/or compare this depository of words used by users associated with a large number of mobile terminals with its word prediction database and may merge a portion of the server's database with its own word prediction database. The server database may also take into account geographical factors, such as certain words are more common in certain locations (e.g., cities, states, countries, etc.). In this case, the server may store geographical identification information associated with the stored terms. A mobile terminal accessing the server may then only retrieve words, terms and/or phrases that are relevant to the geographical region associated with where the mobile terminal is located and/or has been used.

In addition, as described above, time of day usage may be used to determine whether to retrieve a portion of another word prediction database, such as word prediction database 430B. In some implementations, time of day information may also be used by word prediction logic 420 when identifying candidate words corresponding to data input. For example, word prediction logic 420 may rank a candidate word/phrase corresponding to data input via keypad 250 as a more likely word/phrase that a user intends to input when that word/phrase has been previously input by the user of mobile terminal 110 when entering text during that particular time of day than a word/phrase that has not been input by the user during that time of day. As an example, a candidate word that has frequently been input by a user in the morning, such as the word "work" or "breakfast" may be ranked higher in a candidate list (e.g., shown in a more prominent manner, such as shown higher in a list of a number of words provided via display 230, shown in a bolder or larger font etc.) when input that potentially matches this candidate word is entered via keypad 250 at 9:00 AM than another word (or phrase) that is not typically used in the morning by the user of mobile terminal 110.

In still other implementations, location information may be used to determine whether to share databases. For example, if the users of mobile terminals 110 and 120 have input similar words while the user was at particular physical locations, this may indicate that mobile terminal users 110 share various interests. In this case, mobile terminal 110 may merge or store the word prediction database 430B with word prediction database 430 and/or store a portion of word prediction database 430B on mobile terminal 110. Other factors that may aid in determining whether to merge databases may be whether the shared word (i.e., words written at the same location by users of mobile terminals 110 and 120) have been used infrequently by others.

Further, while series of acts have been described with respect to FIGS. 5-7, the order of the acts may be varied in other implementations consistent with the invention. Moreover, non-dependent acts may be performed in parallel.

It will also be apparent to one of ordinary skill in the art that aspects of the invention, as described above, may be implemented in, for example, computer devices, cellular communication devices/systems, methods, and/or computer program products. Accordingly, the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:
1. A first communication device, comprising:
an input device to receive input from a user;
a memory to store a first database, storing at least one word having a usage, the first database associated with word prediction; and
logic to:
    form a connection with a second communication device, the second communication device including a second database, storing at least one word, the second database associated with word prediction,
    obtain at least a portion of the second database,
    analyze the at least a portion of the second database to determine a usage of the at least one word stored in the at least a portion of the second database,
    identify at least one of similarities or differences between the user of the first communication device and a user of the second communication device based on the usage of the at least one word stored in the first database and the usage of the at least one word stored in the at least a portion of the second database, store the at least a portion of the second database in the first communication device based on the identified at least one of similarities or differences, and perform word prediction on the received input using at least the at least a portion of the second database.

2. The first communication device of claim 1, where when storing the at least a portion of the second database, the logic is to:

merge the at least a portion of the second database with the first database; and store the merged first database in the memory.

3. The first communication device of claim 1, where when identifying at least one of similarities or differences between the first database and the at least a portion of the second database, the logic is to:

identify similarities based on the inclusion of at least one infrequently used word in both the first database and the at least a portion of the second database.

4. The first communication device of claim 1, where the logic is further to:

identify whether a first contacts list or a first address book stored in the first communication device and a second contacts list or a second address book stored in the second communication device include at least one same contact; and store the at least a portion of the second database in the first communication device when the first contacts list or the first address book and the second contacts list or the second address book include the at least one same contact.

5. The first communication device of claim 1, where when performing word prediction, the logic is to:

perform word prediction based on a time of day or a period of time.

6. The first communication device of claim 5, where when performing word prediction based on the time of day or the period of time, the logic is to:

weight a word more frequently input during a first time of day as a more likely word candidate corresponding to the received input, if the input is received during the first time of day.

7. The first communication device of claim 1, where when obtaining the at least a portion of the second database, the logic is to:

communicate with the second communication device over a wireless network, and retrieve the at least a portion of the second database without input from the user of the first communication device.

8. The first communication device of claim 1, where the first communication device comprises a mobile terminal.

9. A method comprising:

forming a connection between a first mobile terminal, including a first database, storing at least one word having a usage, the first database associated with word prediction, and a second mobile terminal via a wireless network, the second mobile terminal including a second database, storing at least one word having a usage, the second database associated with word prediction;

obtaining at least a portion of the second database;

analyzing the at least a portion of the second database to determine a usage of the at least one word stored in the at least a portion of the second database;

identifying, at the mobile terminal, at least one of similarities or differences between a user of the first mobile terminal and a user of the second mobile terminal based on the usage of the at least one word stored in the first database and the usage of the at least one word stored in the at least a portion of the second database;

determining whether to store the at least a portion of the second database in the first mobile terminal based on the identifying;

storing the at least a portion of the second database in the first mobile terminal;

receiving input, at the first mobile terminal, from a user via an alpha-numeric keypad; and performing word prediction on the received input using at least the at least a portion of the second database and the first database.

10. The method of claim 9, where the storing the at least a portion of the second database comprises:

merging the at least a portion of the second database with the first database.

11. The method of claim 9, where the identifying at least one of similarities or differences between the user of the first mobile terminal and the user of the second mobile terminal comprises:

identifying similarities based on the inclusion of at least one infrequently used word in both the first database and the at least a portion of the second database.

12. The method of claim 9, further comprising:

identifying whether a first contacts list or a first address book stored in the first mobile terminal and a first contacts list or a first address book stored in the second mobile terminal include at least one same contact; and storing the at least a portion of the second database in the first mobile terminal when the first contacts list or the first address book and the second contacts list or the second address book include the at least one same contact.

13. The method of claim 9, where the performing word prediction comprises:

weighting a word more frequently input by the user of the first mobile terminal during a first time of day as a more likely word candidate corresponding to the received input, if the input is received during the first time of day.

14. The method of claim 9, where the obtaining comprises:

communicating with the second mobile terminal over a wireless network, and retrieving the at least a portion of the second database without input from the user.

15. A computer-readable memory device, located on a second mobile terminal including a second database, storing at least one word having a usage, the second database associated with word prediction, that stores computer-executable instructions which, when executed by at least one processor, cause the at least one processor to:

form a connection with a first mobile terminal via a wireless network;

access a first database of the first mobile terminal, the first database, storing at least one word having a usage, the first database being associated with word prediction;

obtain at least a portion of the first database;

analyze the at least a portion of the first database to determine a usage of the at least one word stored in the at least a portion of the first database;

identify at least one of similarities or differences between the user of the first mobile terminal and a user of the second mobile terminal based on the usage of the at least one word stored in the at least a portion of the first database and the usage of the at least one word stored in the second database; and store the at least a portion of the first database in a memory, based on the identified at least one of similarities or differences.

16. The computer-readable memory device of claim 15, where the instructions for identifying the at least one of similarities or differences between the user of the first mobile terminal and the user of the second mobile terminal cause the at least one processor to:
   identify similarities between the first database and the second database based on the inclusion of at least one infrequently used word in both the at least a portion of the first database and the second database.

17. The computer-readable memory device of claim 15, where the instructions for identifying the at least one of similarities or differences between the at least a portion of the first database and the second database cause the at least one processor to:
   identify similarities between the user of the first mobile terminal and the user of the second mobile terminal based on common information stored in a first contacts list or a first address book stored in the first mobile terminal and a second contacts list or a second address book stored in the second mobile terminal.

18. The computer-readable memory device of claim 15, further comprising computer-executable instructions to cause the at least one processor to:
   receive user input associated with a text message; and
   perform word recognition on the user input using at least the at least a portion of the first database.

19. The computer-readable memory device of claim 18, where the instructions to cause the at least one processor to perform word recognition, further cause the at least one processor to:
   weight a word more frequently input by the user of the second mobile terminal during a first time of day as a more likely word candidate corresponding to the received input, if the input is received during the first time of day.

20. A first communication device, comprising:
   an input device to receive input from a user;
   a processor;
   a memory to store a first database associated with word prediction and to store instructions that when executed by the processor, cause the processor to:
      form a connection with a second communication device, the second communication device including a second database associated with word prediction,
      obtain at least a portion of the second database,
      store the at least a portion of the second database in the first communication device, and
      perform word prediction, based on a time of day or a period of time, on the received input using at least the at least a portion of the second database.

* * * * *